Jan. 16, 1934. S. N. WIGHT Re. 19,053

TRAIN DISPATCHING SYSTEM FOR RAILROADS

Original Filed Feb. 28, 1928 3 Sheets-Sheet 1

INVENTOR
S. N. Wight,
BY
Neil W. Preston
his ATTORNEY

Jan. 16, 1934. S. N. WIGHT Re. 19,053

TRAIN DISPATCHING SYSTEM FOR RAILROADS

Original Filed Feb. 28, 1928 3 Sheets-Sheet 2

INVENTOR
S. N. Wight,
BY
Neil W. Preston,
his ATTORNEY

Jan. 16, 1934. S. N. WIGHT Re. 19,053
TRAIN DISPATCHING SYSTEM FOR RAILROADS
Original Filed Feb. 28, 1928 3 Sheets-Sheet 3
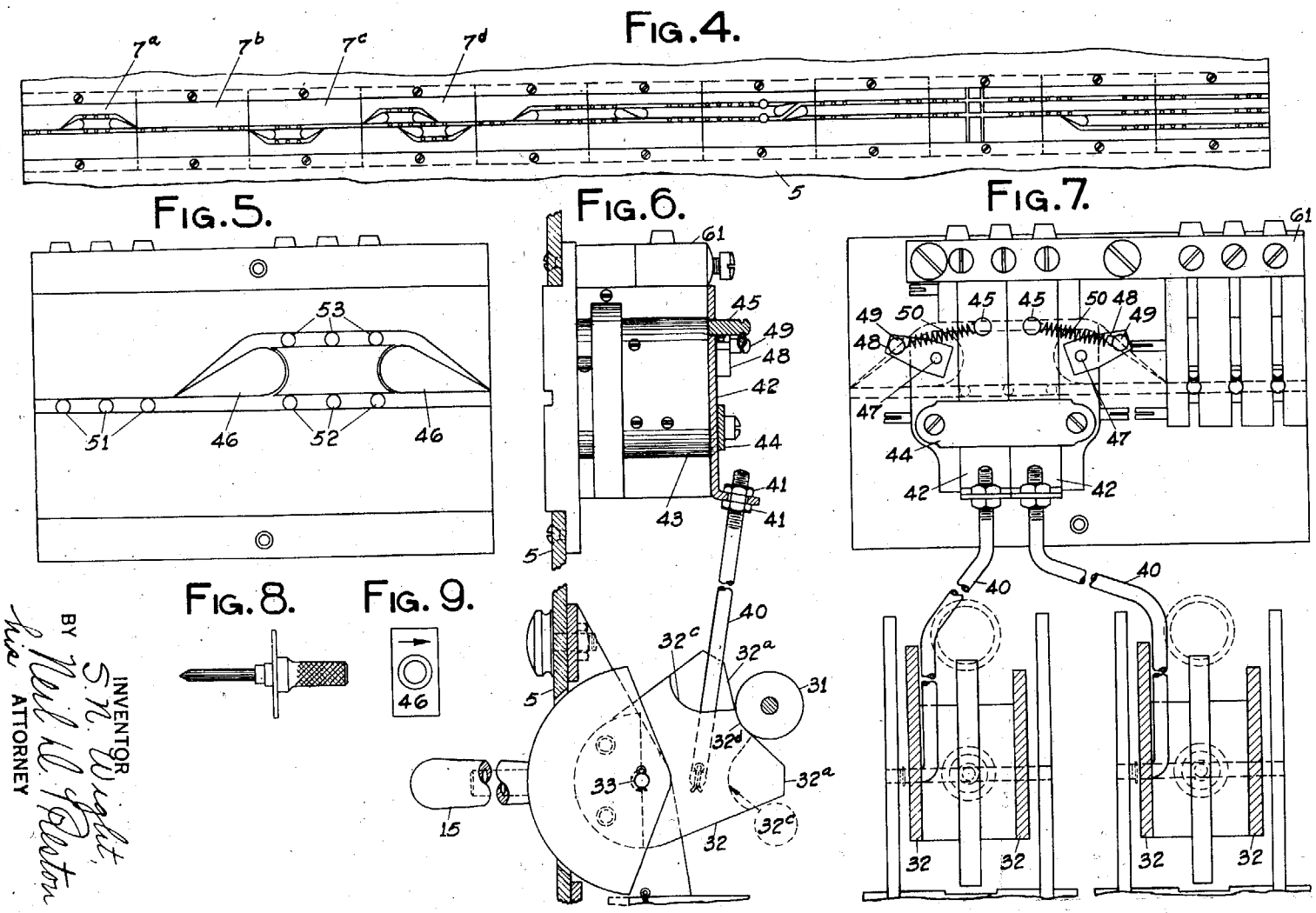
INVENTOR
S. N. Wight,
BY
Neil W. Preston
his ATTORNEY Reissued Jan. 16, 1934

Re. 19,053

UNITED STATES PATENT OFFICE 19,053

TRAIN DISPATCHING SYSTEM FOR RAILROADS

Sedgwick N. Wight, Rochester, N. Y., assignor to General Railway Signal Company, Rochester, N. Y.

Original No. 1,759,383, dated May 20, 1930, Serial No. 257,643, February 28 1928. Application for reissue May 14, 1932. Serial No. 611,429

15 Claims. (Cl. 246—122)

This invention relates to train dispatching systems for railroads, and more particularly to the dispatcher's control and indication board for such systems.

This control and indication board, for convenience, called a "dispatching machine" affords means for permitting the dispatcher to control distant track switches, movable-point frogs and derails, and the signals associated with these traffic controlling devices, and further gives the dispatcher the necessary information to enable him to control the movement of trains over these devices.

In accordance with the present invention it is proposed to co-ordinate the actual track layout over which the trains are to be dispatched and a miniature track layout forming part of the dispatching machine, so as to at all times enable the dispatcher to ascertain from the miniature track layout actual traffic conditions on the railroad not visible to him. In the specific arrangement of the dispatching machine illustrated, the dispatcher is informed as to actual traffic conditions on the railroad by the position of the switch points of his miniature track layout, the illumination of OS-ing lamps (which inform him of the passage of trains over the switch points), and illuminated direction lamps which indicate the direction in which trains may travel over single track sections and the main tracks associated with a passing siding, and by plugs, which represent trains, and which are manually shifted from one place to another on the miniature track layout as the train movement is intermittently indicated by the OS-ing lamps.

Other objects, purposes and characteristic features of the invention will in part be obvious from the accompanying drawings and in part be pointed out hereinafter.

In describing the invention in detail reference will be made to the accompanying drawings in which:—

Fig. 4 shows a large number of panels arranged end to end of a miniature track layout which may be built up out of standard interchangeable track portions;

Fig. 5 is an enlarged view of a passing siding of the miniature track layout;

Fig. 6 is a side elevation of a track portion shown in Fig. 7 with a portion thereof shown in cross section, together with the control lever associated therewith;

Fig. 7 illustrates a back view of the apparatus shown in Fig. 5 of the drawings together with the control lever; and Figs. 8 and 9 illustrate one of the plugs representing a train, and identifying its number and the direction in which it is moving.

Figure 1:
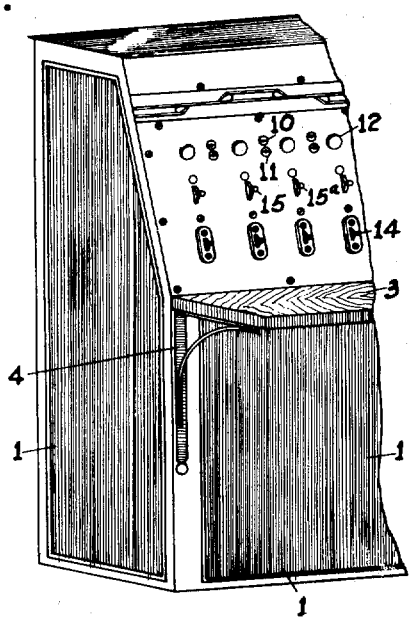
Fig. 1 is a partial perspective view of a dispatching machine embodying the present invention.

Although the dispatching machine illustrated, as an embodiment of the present invention, is adapted for use with various types of train dispatching systems it is more particularly adaptable to the systems shown in my prior application Ser. No. 120,423 filed July 3, 1926, but a system which specifically differs from this system in that direction arrow lights 10 and 11 are used instead of the direction indicating blades shown in my said prior application. The direction arrow lights 10 and 11 are preferably controlled in a manner as disclosed in my prior Patent No. 1,713,496 dated May 14, 1929. Also, instead of recording the number of trains on a recorder, as shown in my application Ser. No. 120,423, the movement of such trains over a track switch is preferably continuously visually indicated in a manner as illustrated by the lamp I in my prior Patent No. 1,794,-565 dated Mar. 3, 1931, by the lamp 12 of the present application. The control levers 15 directly mechanically control the position of the symbolic switch points of the miniature track layout associated therewith, and also electrically control the distant track switches and wayside signals, and for this reason these symbolic or miniature switch points are also mechanically connected to the contacts which control the distant track switches. The control switch 14 is used to change the functioning of a suitable audible signal, and is connected in a circuit arrangement as more clearly shown in my Patent No. 1,770,364 dated July 8, 1930.

The preferred form of the train dispatching machine consists of a housing 1 of the general shape shown, having a removable back panel 2 and a projecting desk 3 supported by brackets 4, the panel board containing the various control levers, switches and indicating lamps. This panel preferably comprises two metal strips 5 and 6 spaced sufficiently far enough apart to receive the interchangeable miniature track portions $7^a$, $7^b$, $7^c$, $7^d$, etc. In the particular arrangement shown, the control lever 15 (see Fig. 3) controls two rows of movable contacts 16, 17, and 18, connected by rods 29, operated by two rollers 31 (see Figs. 6 and 7). The contacts 16, 17 and 18 are adapted to co-operate with stationary contacts 19 and 20, and the movable contacts 21 and 22, respectively. All of these contacts are normally separated and the particular point of making and breaking of these contacts is different and is adjustable by reason of the adjustable manner in which stationary contacts 19, 20, 21 and 22 are secured to their supporting arms by the adjustable threaded connections including locknuts 23. It should be noted that the various contact arms carrying these stationary contacts are pivotally supported by pins 24, and that they are biased against stops 25 by suitable spring means, not shown. These two sets of movable contact arms for each lever 15 are connected as by pins 26, 27, and 28 to two operating rods 29 biased in a direction toward the control lever 15 by a spring 30. Also, the extreme left-hand end of each of these rocking arms 29 has a roller 31 pivotally connected thereto, which roller 31 engages the cam 32 connected to the operating lever 15. It should be noted (see Fig. 6) that the rollers 31 may assume three different positions depending upon whether they are riding on the top portion $32^a$ of the cam, are riding on the intermediate portion $32^b$ or are riding on the lower portion $32^c$, and by reason of this fact the movable contacts 16, 17 and 18 are operable to three different positions in accordance with the movement of the lever about its pivot 33. It should be noted that by reason of the reverse action of the two cams 32 one of the rocker arms 29 is moved in one direction when the other of the same lever is moved in the other. Both of these rocker arms are shown in their neutral position because the lever 15 is shown in its neutral position.

The switch 14 may be of any suitable construction, and has been shown as a cam switch similar to lever 15 adapted to close either of two circuits (see Fig. 3) when assuming its two extreme positions, and maintaining such circuits broken when in the neutral position. In other words, switch 14 is preferably the same as switch 15, and the two circuits mentioned are controlled, respectively, by contacts similar to 16—19 and 18—22.

Referring to Figs. 6 and 7 it is noted that an operating rod 40 is pivotally connected to one of the cams 32 of lever 15, and that it is adjustably connected by its threaded end and nuts 41 to the slide bar 42. These slide bars 42 (see Figs. 6 and 7) are arranged to slide on the blocks 43 supporting pins 47 and are held in position by the retaining bar 44, and each slide bar 42 has a pin 45 projecting from the side thereof.

On the front of the miniature track layout are slots representing tracks and sidings, which slots may be shifted (see the seventh panel of Fig. 4 representing an open crossover, as distinguished from a closed crossover, as shown in panel 6 of Fig. 4) by indicators 46 (conventionally representing switch points of track switches), which indicators are secured to pins 47 pivoted in the blocks 43. These indicators 46 are shown in dotted lines the curved parts of which are concentric with pin 47 (see Fig. 7 of the drawings). It should be noted that this miniature track is composed of blocks or sections all of which are interchangeable, so that any commercial track layout may be reproduced on a miniature scale from these standard interchangeable parts. These pins 47 carrying the switch points 46 project from the rear of the blocks 43 a sufficient distance to receive the cranks 48 having crank pins 49. The permissible distance of movement of the crank 48 is determined by the indicators 46. The extent of movement of the slide bar 42, is such that if the lever 15 is moved to either extreme position the miniature switch points 46 are preferably by toggle-snap action moved to the corresponding position. Further the pins 45, 47 and 49 are so related and the distances of movement of pins 45 and 49 are so proportioned that if the lever 15 is moved from an extreme position to the neutral position, it will not shift or change the position of the miniature switch point 46. In other words if the crank 48 assumes one extreme position and the slide bar 42 assumes its middle position the spring 50 which connects pins 45 and 49 still lies on the same side of pivot 47 as does the pin 49. If, however, the slide bar 42 is moved from one extreme to the other extreme position the spring 50 is moved past the center of the pin 47, and the crank 48 is operated by snap action to the other extreme position. The net result is that the miniature switch point indicates the last extreme position the control handle 15 has assumed and therefore indicates the position of the outlying track switch.

As shown in Fig. 5 each single track section contains, say three plug holes 51, the main track of each passing siding includes three plug holes 52 and the side track of each passing siding contains at least three plug holes 53. These plug holes are adapted to receive plug's tokens or train symbols, a train occupying the corresponding part of the railway track as illustrated by the part of the miniature track in which such plug is inserted. These plugs preferably have detachably connected thereto means symbolic of the train which is represented thereby and the direction in which such train is moving. One form which the plug in question may assume, has been illustrated in Figs. 8 and 9 of the drawings, in which the number 46 represents the train number.

Figure 3:
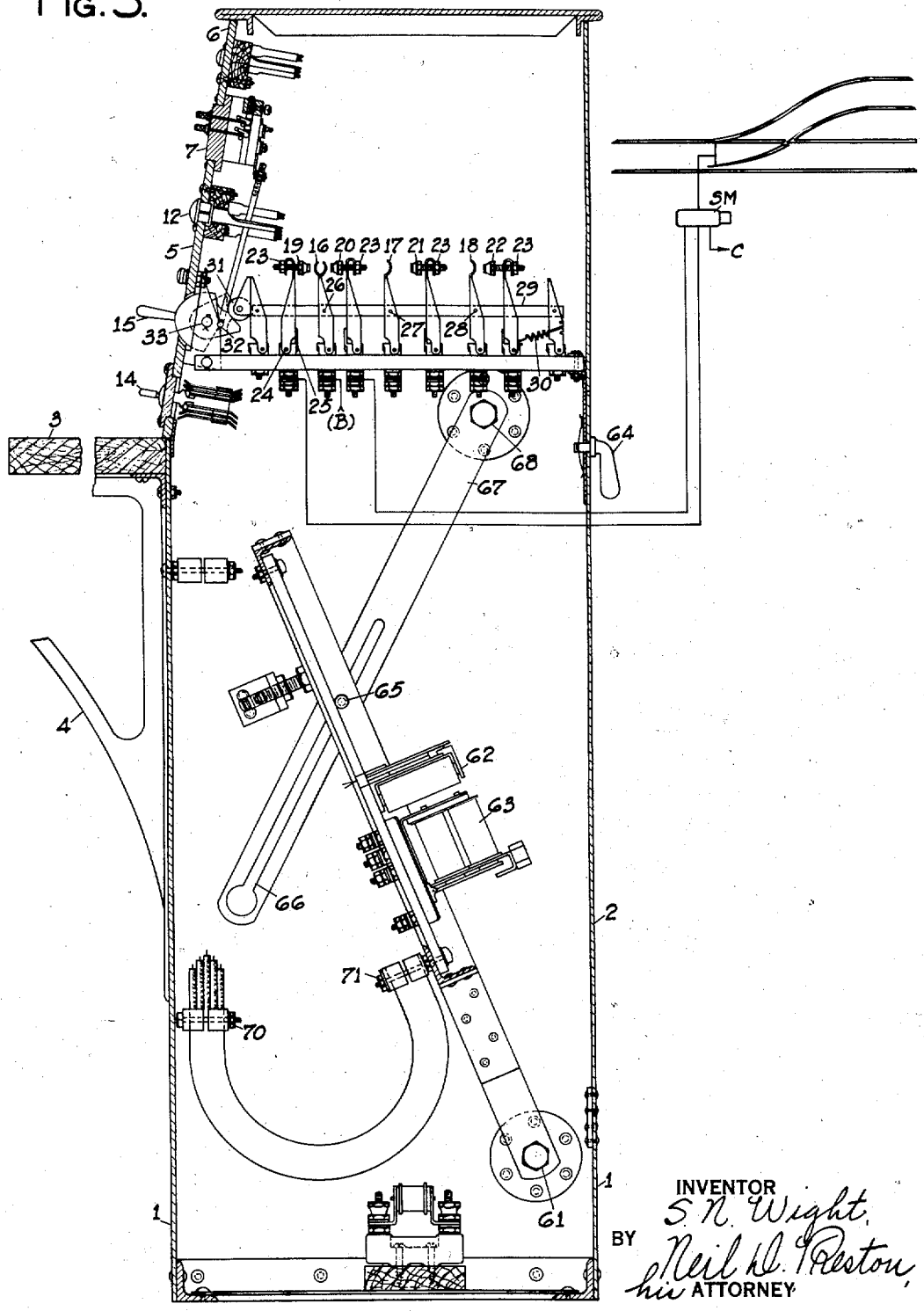
Fig. 3 is a side elevation of the dispatching machine, illustrating parts thereof in cross section.

The various relays 62 and relays or audible signals 63 employed in a train dispatching system using the dispatching machine in question, and using the circuit arrangement disclosed in my prior application above referred to, are preferably mounted on the relay panel board 60 (see Fig. 3). The audible signal is preferably sounded only momentarily in response to a change in traffic conditions, as is shown by the bells "BL" in Figs. 1, 3, and 4 of prior Patent No. 1,770,364 to which reference has already been made. This relay panel board 60 is pivoted at its lower edge to the casing 1 of the dispatching machine as by bolts 61. Upon removal of the back panel 2, which panel is normally held in place by the latch 64, this relay panel board 60 may be swung back out of the dispatching machine to a position in which the pins 65 projecting from the ends of panel 60 engage the lower ends of the slots 66 in the supporting bracket 67, this bracket 67 being pivotally secured to the dispatching machine as by bolts 68. As shown the control wires are preferably bunched together and secured in the dispatching machine, as by a clamp 71, sufficient slack being allowed to permit the panel board to be swung to its outward position, thus enabling the wiring associated with the various audible signals and relays to be inspected, repaired, and replaced.

*Operation*

Figure 2:
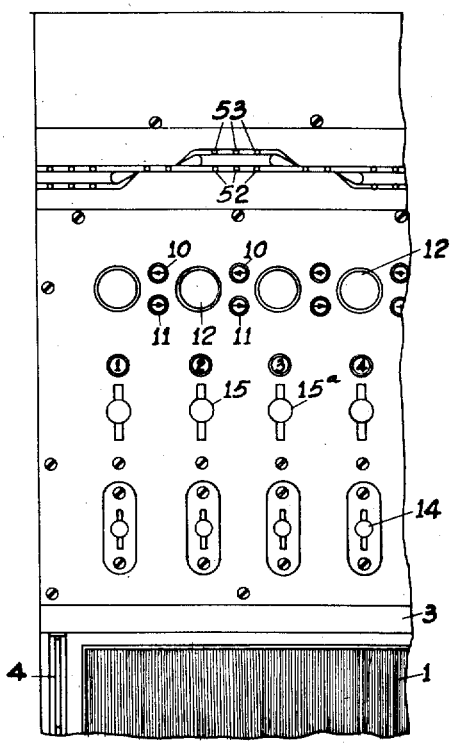
Fig. 2 is an enlarged front view of a portion of the operating panel shown in Fig. 1.

Let us assume that it is desired to operate a distant switch machine SM and the associated signals to allow the passage of a train by such trackway location. This may be accomplished by the operator moving a particular lever or handle 15 to the upper or lower position depending on whether the train is to take the siding or main track. If the handle 15 is moved to the upper position the particular switch machine SM is operated by current from a battery having terminals B and C to the reverse or take-siding position. If the operator then moves the switch handle 15[a] to the lower position the track switch controlled by this lever 15[a], and likewise the miniature switch point 46 on the dispatching machine, is moving to the main track position. Since the lever 15 was moved prior to the lever 15[a] the direction arrow light 11 is illuminated for reasons more clearly described in my prior Patent No. 1,713,496 thereby indicating that the direction of traffic set up is from left to right. Likewise, the proper way-side signals associated with the two track switches are cleared, assuming traffic conditions in advance to be favorable, and the train may proceed in response to the indicating conditions of such signals. As the train in question accepts the signals associated with the track switch controlled by lever 15 and threads upon the detector track circuit associated with this track switch the lamp 12 associated with lever 15 is illuminated, and the dispatcher is informed that the train has entered the end of the siding containing this track switch, and he will accordingly place a plug in the hole 53 (see Fig. 2) as soon as the train has passed entirely off of the detector track circuit, at which time the lamp 12 is again extinguished and the operator is informed that the train is entirely within the siding limits. Three plug holes, such as 53, have been shown for each section of trackway for the purpose of enabling the dispatcher to semi-automatically record the presence of a plurality of trains on a particular section such as the siding in question. From this brief description it is apparent that if the dispatcher observes the illumination of the various lamps, observes the illumination of the direction arrow lights adjacent to these lamps 12, and then moves the plugs representing the particular train in question, in the proper holes in the miniature track portion corresponding to the actual portion on which the train is moving, depending of course on the position assumed by the miniature switch points, he will have before him, so to speak, a miniature railway system of which each train is represented by a symbolic train consisting of a plug containing an arrow indicating the direction of train movement, colored to indicate the class of the train (freight, passenger, extra or work train) and a number corresponding to the number of such train, and in which the position of each track switch is indicated by the position of a miniature track switch.

Having thus shown and described a specific embodiment of a dispatching machine conforming with the present invention, and having shown many parts thereof conventionally, it is desired to be understood that the particular illustration of the invention shown has not been selected to illustrate the specific construction preferably employed in practice, nor has it been shown to illustrate the scope of the invention, and it is desired to be understood that various changes, modifications and additions may be made to adapt the dispatching machine embodying this invention to the particular train dispatching system in connection with which it is to be used, all without departing from the spirit or scope of the invention or the idea of means underlying the same, except as demanded by the scope of the appended claims.

What I claim is:—

1. A dispatching machine for dispatching by signal indications visible to the engineer the movement of trains and indicating train movements to the dispatcher comprising, a control board, a plurality of levers on said board, one for each track switch, an indicator for each lever indicating the passage of a train by the track switch controlled by the corresponding lever, and indicating means between two adjacent levers for indicating the direction of train movement between the track switches controlled by such adjacent levers.

2. A dispatching machine for dispatching by signal indications translatable by the engineer the movement of trains and indicating train movements to the dispatcher comprising, a control panel, a miniature track layout corresponding to the railway system controlled by the train dispatching machine, a lever for each track switch of the miniature track co-ordinated with the track switch of such miniature track, said lever controlling the corresponding track switch of the railway system, and an indicating lamp also co-ordinated with the lever controlling the corresponding distant track switch for indicating the movement of a train over such distant track switch.

3. A dispatching machine for dispatching by suitable signal indications the movement of trains over a railway system comprising, a control panel, a miniature track layout arranged horizontally on said panel and corresponding to the actual railway system controlled by the dispatching machine, a lever for each miniature track switch arranged in vertical alinement with such miniature track switch for controlling the corresponding distant track swich, and means for causing said miniature track switch to assume a position corresponding to the position of said lever.

4. A dispatching machine for dispatching by signal indications interpretable by the engineer the movement of trains comprising, a panel, a miniature track layout arranged horizontally on said panel and including a plurality of miniature track switches, a lever for each miniature track switch arranged in vertical alinement with such track switch and adapted to assume a neutral and two extreme positions for controlling the corresponding distant track switch, and means for operating said miniature track switch to the same extreme position the corresponding lever has last assumed in spite of the fact that such corresponding lever has thereafter been returned to the neutral position.

5. A dispatching machine for dispatching by signal indications visible to the engineer the movement of trains and for indicating train movements to the dispatcher comprising, a cabinet, a panel associated with the front of said cabinet, a projecting desk projecting from said cabinet below said panel board, a miniature track layout on said panel board including a plurality of miniature track switches, a lever for each of said miniature track switches, and means for indicating the passage of a train over the track switch controlled by the corresponding lever.

6. A dispatching machine for dispatching by signal indications perceived by the engineer the movement of trains and for indicating train movements comprising, a cabinet, a panel board forming a part of the front wall of said cabinet, a desk projecting from the lower edge of said panel board, a pivoted relay panel contained in said cabinet containing a large number of electro-responsive devices, and means permitting said relay panel to be swung out of said cabinet to a position facilitating inspection and repairing of said electro-responsive devices.

7. A dispatching machine for dispatching by way-side signal indications the movement of trains and for indicating train movements comprising, a panel, a miniature track layout on said panel board including a plurality of miniature track switches and associated levers for controlling the distant track switches represented by the corresponding miniature track switches, an audible signal for sounding the passage of trains by such distant track switches, and a cut-out switch arranged in juxtaposition with said lever for manually cutting out said audible signal.

8. A dispatching machine for dispatching by way-side signal indications the movement of trains and indicating train movements to the dispatcher, comprising, a control board, a plurality of levers on said board, one for each track switch, an indicator for each lever indicating the passage of a train by the track switch controlled by the corresponding lever, and indicating means between two adjacent levers for indicating the direction of train movement between the track swiches controlled in accordance with the sequence of operation of such adjacent levers.

9. In a power operated railway track switch of a railway system, a miniature track layout corresponding to said system and having a miniature switch point corresponding to said track switch, contacts associated with said miniature switch point to operate said track switch to its normal position closed when said miniature switch point is moved to the normal position, and other contacts associated with said minature switch point to operate said track switch to the take-siding position closed when said miniature switch point is moved to the take-siding position.

10. In a power operated railway track switch of a railway system, a miniature track layout corresponding to said system and having a miniature switch point pivoted vertically with respect to the face of said miniature track layout and located at a point corresponding to said track switch, contacts associated with said miniature switch point to operate said track switch to its normal position closed when said miniature switch point is moved to the normal position, and other contacts associated with said miniature switch point to operate said track switch to the take-siding position closed when said miniature switch point is moved to the take-siding position.

11. In a power operated railway track switch of a railway system, a miniature track layout corresponding to said system and having a manually operable miniature switch point corresponding to said track switch, contacts associated with said miniature switch point to operate said track switch to its normal position closed when said miniature switch point is moved to the normal position, and other contacts associated with said miniature switch point to operate said track switch to the take-siding position closed when said miniature switch point is moved to the take-siding position.

12. In a power operated railway track switch of a railway system, a miniature track layout corresponding to said system and having a manually operable miniature switch point pivoted vertically with respect to the face of said miniature track layout and located at a point corresponding to said track switch, contacts associated with said miniature switch point to operate said track switch to its normal position closed when said miniature switch point is moved to the normal position, and other contacts associated with said miniature switch point to operate said track switch to the take-siding position closed when said miniature switch point is moved to the take-siding position.

13. In a power operated railway traffic controlling device of a railway system, a miniature track layout representative of the actual track layout and its traffic controlling devices and including a manually operable miniature traffic controlling device, and contacts mechanically connected with said miniature traffic controlling device for when closed closing a control circuit to operate the corresponding actual traffic controling device to a position corresponding to that then assumed by said miniature traffic controlling device.

14. In a power operated railway traffic controlling device of a railway system, a miniature track layout representative of the actual track layout and its traffic controlling devices and including a manually operable miniature traffic controlling device pivotally secured in said miniature track layout, and contacts mechanically connected with said miniature traffic controlling device for when closed closing a control circuit to operate the corresponding actual traffic controlling device to a position corresponding to that then assumed by said miniature traffic controlling device.

15. In a system for the remote control of track switches on railroads, a control panel having lines thereon representing railroad tracks, a miniature track switch pivoted on the face of said panel at a point corresponding to the location of an actual track switch in the field, said miniature switch being movable with respect to the representation of the track layout so as to simulate the different positions assumed by the corresponding track switch in the field, circuit controlling means supported on the back of said panel for governing the operation of said track switch in the field, and means adapted for manual movement for simultaneously operating said miniature switch and said circuit controlling means to corresponding positions, whereby said miniature track switch is set to one position or the other to indicate a route for train movement when the operator controls the track switch in the field to assume a corresponding position.

SEDGWICK N. WIGHT.